US011756360B2

(12) United States Patent
Lynch

(10) Patent No.: US 11,756,360 B2
(45) Date of Patent: Sep. 12, 2023

(54) SYSTEM AND METHOD FOR REMOTELY AUTHORIZING ACCESS TO PROPERTY

(71) Applicant: Samuel Truman Lynch, Ogden, UT (US)

(72) Inventor: Samuel Truman Lynch, Ogden, UT (US)

( * ) Notice: Subject to any disclaimer, the term of this patent is extended or adjusted under 35 U.S.C. 154(b) by 112 days.

(21) Appl. No.: 17/665,499

(22) Filed: Feb. 5, 2022

(65) Prior Publication Data
US 2023/0252836 A1     Aug. 10, 2023

(51) Int. Cl.
*G07C 9/27*     (2020.01)
*G07C 9/23*     (2020.01)
*G06Q 50/16*    (2012.01)
*H04N 7/15*     (2006.01)

(52) U.S. Cl.
CPC ............. *G07C 9/27* (2020.01); *G06Q 50/163* (2013.01); *G07C 9/23* (2020.01); *H04N 7/157* (2013.01); *G07C 2209/08* (2013.01)

(58) Field of Classification Search
CPC ........ G07C 9/27; G07C 9/23; G07C 2209/08; G06Q 50/163
See application file for complete search history.

(56) References Cited

U.S. PATENT DOCUMENTS

| 10,854,027 | B1 * | 12/2020 | Lucks ..................... G07C 9/253 |
| 2017/0213404 | A1 * | 7/2017 | Sivalingam ............ G07C 9/257 |
| 2023/0098097 | A1 * | 3/2023 | Vaid ..................... G06F 21/6209 726/1 |
| 2023/0153932 | A1 * | 5/2023 | Caputo .............. G06Q 10/1095 705/7.19 |

* cited by examiner

*Primary Examiner* — Nabil H Syed

(57) ABSTRACT

Disclosed herein is a system and a method to remotely control operation of an electronic lock securing access to a real estate property. The invention disclosed allows a buyer agent to remotely control operation of an electronic device associated with the prospective buyer and uses the electronic device of the buyer to unlock an electronic lock that secures access to the real estate property. This alleviates the need to share the password with the buyer and thereby maintaining confidentiality of the electronic lock password and security of the real estate property and at the same time enabling access of the property to the buyer without the buyer agent being physically present on the real estate property.

14 Claims, 2 Drawing Sheets

SYSTEM AND METHOD FOR REMOTELY AUTHORIZING ACCESS TO PROPERTY

TECHNICAL FIELD

This disclosure relates to generally to electronic devices, and more particularly, to remote operation of secured electronic devices.

BACKGROUND

Today's digital world has enabled remote operation of devices as well virtual meetings thereby enabling a connected living environment. Further, rise of COVID-19 pandemic has validated the need for such virtual connected environment without physical association to significant strength. Almost all service sectors have incorporated digital experiences in their operations while minimizing the needs for physical experience. One of the major service sectors where physical presence is essential is real estate sale purchase. The buyer/renter prefers to have a tour of the property before investing into the same. It's unlike other e-commerce sectors where goods are purchased based on stored images of products. However, real estate purchases are more detailed and require guided tour of property a buyer agent. Moreover, seller agents have started to incorporate electronic locks to secure unauthorized access to the seller's property by trespassers. Therefore, both factors add to the required presence of a buyer agent in case a buyer is interested in a real estate property.

Conventionally, buyer agents have physically accompanied prospective buyers and provide them a guided tour of the property. One of the latest used methods is accompanying the prospective buyer to unlock the electronic lock thereby securing access to the real estate property.

However, physically accompanying prospects is not practically feasible every time since the buyer agent might not be available for the physical visit as time availability for both parties might not match. Further, in times of COVID-19, it is not advisable to conduct physical meetings. Moreover, sharing passwords with prospective buyers might result in unauthorized usage of confidential password.

In light of above mentioned problems associated with the real estate industry, especially those related to guided tour of property, it is desirable to have a system and method for remote and virtual guided tours while maintaining secure access to the property.

SUMMARY

The present disclosure seeks to provide a system and a method to remotely control operation of an electronic lock securing access to a real estate property. The invention disclosed allows a buyer agent to remotely control operation of an electronic device associated with the prospective buyer and use the electronic device of the buyer to unlock an electronic lock that secures access to the real estate property. This alleviates the need to share the password with the buyer and thereby maintaining confidentiality of the electronic lock password and security of the real estate property and at the same time enabling access of the property to the buyer without the buyer agent being physically present on the real estate property.

Embodiments of the present disclosure substantially eliminate or at least partially address the aforementioned problems.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

OBJECT OF INVENTION

One of the objects of the disclosed invention is to remotely control operation of an electronic lock securing access to a real estate property.

Another object of the present invention is to enable buyer agents to provide a virtual guided tour of the property remotely.

Yet another object of the present invention is to prevent maintain security of the property.

Another object of the present invention is to reduce operating costs associated with multiple visits to the property.

BRIEF DESCRIPTION OF THE DRAWINGS

The summary above, as well as the following detailed description of illustrative embodiments are better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

It will be appreciated that the drawings illustrated herein are for representation purposes only and do not intend to limit the scope of the present disclosure, and actual implementation of the present disclosure may be viewed substantially differently.

DETAILED DESCRIPTION

The following description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The present invention relates to a system and method for remotely authorizing access to a property listed for rent or sale. Typically, in said transaction setup, there is a property listed for sale/lease/rent. The said property could be a real estate property or a car or any such other movable or immovable property. The setup further comprises a buyer agent who accompanies prospective buyers when virtually touring the property. The term "buyer agent" further comprises an exclusive licensee of the buyer who has been entrusted with the task of providing secure access to properties for sale/rent. Furthermore, there is a prospective "buyer" who intends to buy or rent the said property. In a preferred embodiment of the present invention, the property is a real estate property.

Figure 1:
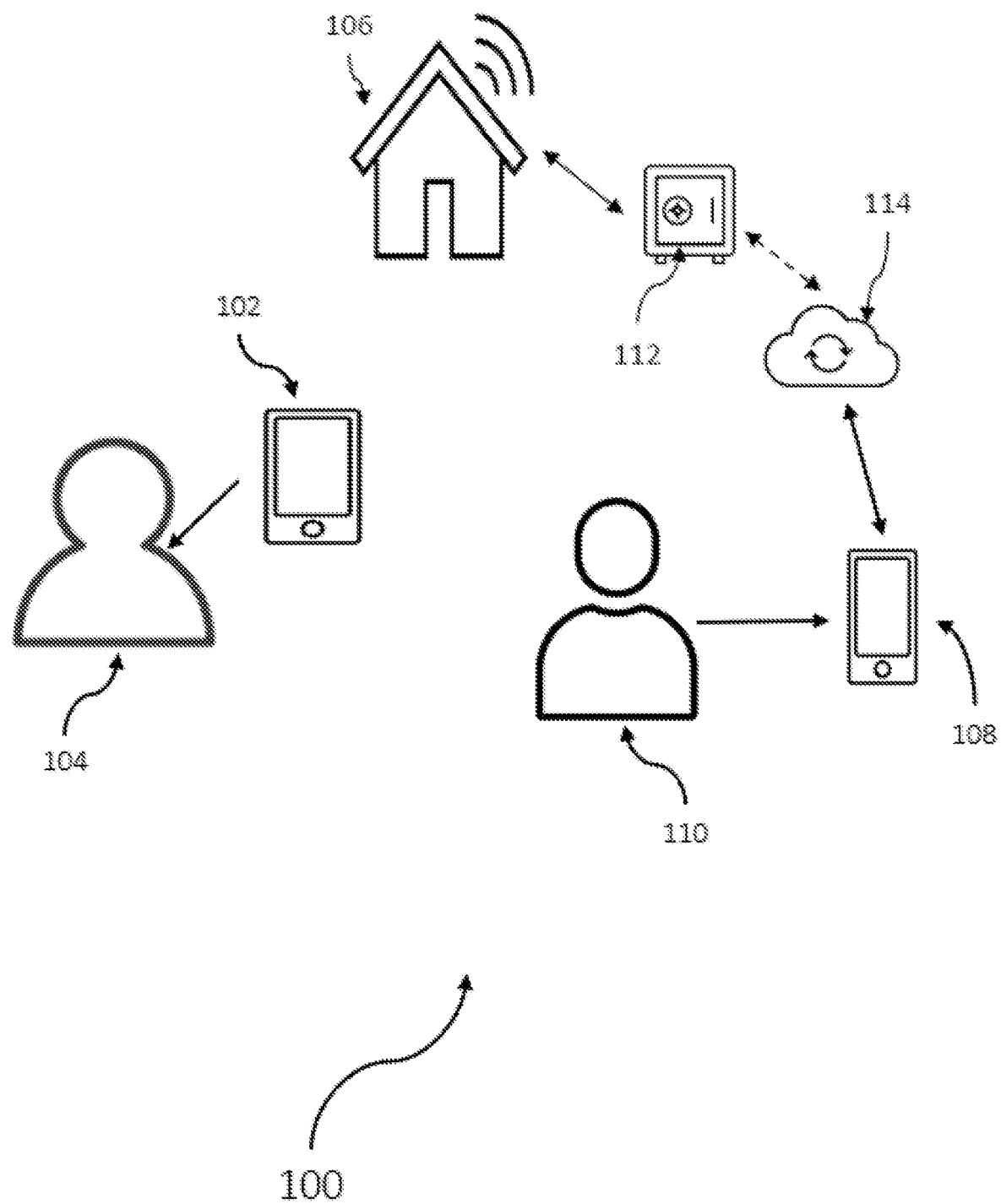
FIG. 1 depicts the block diagram of the exemplary system as per the present disclosure.

Referring to FIG. 1, the system 100 comprises a first electronic device 102 associated with a buyer agent 104 and a second electronic device 108 associated with a buyer 110 of the property 106. The term "electronic device" comprises any type of computing device, such as a desktop computer system, a laptop, cellular phone, a smart device, a mobile telephone, a tablet style computer, wearable bands, credit cards or smart cards or any other device capable of wireless communication.

In an aspect of the present invention, the first electronic device 102 and the second electronic device 108 are installed with a control application. The control application allows real time device control using a control request. Non-limiting examples of said control applications are TeamViewer®, AnyDesk®, and so on. The control application allows the first electronic device 102 (controller device) to control operations of the second electronic device 108 (controlled device) in a manner so that the controller device is able to control the controlled device remotely. Typically, both of the electronic devices are configured to receive control requests from one another. The control application functions by sending a control request from one electronic device to another electronic device. The control request typically comprises permissions to access another electronic device and remotely control the operations of another electronic device. Optionally, the control request may further contain attachments and files to be transferred to the second electronic device 108 remotely from the first electronic device 102. In a preferred embodiment, the control request is sent from the first electronic device 102 to the second electronic device 108 through existing cellular data communication channels. The second electronic device 108 receives the control request, and the first electronic device 102 controls the operation of the second electronic device 108 based on successful acceptance of the control request by the second electronic device 108. It shall be noted that in order to manage the control of electronic devices, both the first electronic device and the second electronic device are installed with same type, manufacture and version of the control application. Otherwise, the control request will not be successfully transmitted across the electronic devices.

In another aspect of the present invention, the property 106 is securely locked with an electronic lock 112. The electronic lock 112 secures access to the property 106 by locking the entrance door to the property 106. Typically, the seller agent installs the electronic lock 112 to secure the property 106 from trespassers and unauthorized access. The electronic lock 112 has two states, a lock state and an unlock state. The state of electronic lock 112 is changed using a native application. The electronic lock 112 secures the entrance door by means of a lockbox, or a door lock with a latch, or a deadbolt. In case of a lockbox, when first opened, the bottom drops out with the keys inside and the buyer 110 can unlock the entrance door using the keys. In case of a door lock with a latch, the latch releases when the electronic lock 112 is operated to unlock position. Furthermore, the entrance door may be secured using a deadbolt that unlocks through a motor operation triggered by the electronic lock 112 in unlock position. The electronic lock 112 can be accessed using an alphanumeric password.

In the preferred embodiment of the preset invention, the electronic lock 112 is protected by an alphanumeric password and is controlled electronically by means of a native application residing on the second electronic device 108. The prospective buyer 110 shall be asked to install the native application prior to the scheduled visit to the property 106. The native application may also be accessed through a browser. The native application is configured to display, on a graphical user interface, a unlock button and responsive to pressing of the unlock button, an input field for password associated with the electronic lock 112 is displayed. The native application is operable to input alphanumeric password for the purpose of unlocking the electronic lock 112.

The native application is communicably coupled to the electronic lock 112 though a data communication network 114. The data communication network 114 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of the foregoing.

The electronic lock 112 is configured to match the alphanumeric password inputted through the native application and in case of a successful match and validation, unlock the door lock of the entrance gate of the property 106. In case of wrong input, an error message is displayed on the graphical user interface of the native application.

Once the door lock is unlocked base on successful validation of the alphanumeric password entered by the buyer agent 104 on the native application, the control of second electronic device 108 by the first electronic device 102 is terminated by the buyer 110 since the access to the property 106 is now authorized.

In yet another aspect of the present invention, the first electronic device 102 and the second electronic device 108 are further installed with a software application wherein the software application is operable to initiate a virtual tour of the property 106 once the electronic lock 112 is unlocked by the native application and access to the property 106 is authorized. The software application is configured for real time video conferencing by initiating a connection, over a cellular network, between the first electronic device 102 and the second electronic device 108. Buyer agent 104 and the buyer 110 may communicate to one another over the software application. Non-limiting examples of said software applications are FaceTime®, GoogleMeet®, or Skype®. This real time video conferencing results in a virtual tour of the property 106 wherein the buyer agent 104 may guide, describe and show to the buyer 110 one or more features of the property 106.

The virtual tour is recorded and saved for later use. The buyer 110 may want to watch the recorded tour later for better understanding and clarity for decision. The recorded session may also be used in case of late claims of fraud, defects in property 106 and sub-standard quality. Once the tour is complete, the software application terminates the connection between the first electronic device 102 and the second electronic device 108.

In operation, a buyer agent 104 schedules an appointment to visit the property 106 via a Multiple Listing Service or directly through the seller agent or seller of the property 106. The buyer 110 is pre-advised to download and install a native application on the second electronic device 108 associated with the buyer 110, prior to buyer's visit to the property 106. The native application, as discussed before, is operable to unlock the electronic lock 112 attached to the property 106. Once the buyer 110 arrives at the property 106 site, the buyer 110 calls the buyer agent 104 and requests for access to the property 106. The buyer agent 104, through the control application on the first electronic device 102 associated with the buyer agent 104, sends a control request to the second electronic device 108 associated with the buyer 110 in order to remotely control the second electronic device 108. The buyer 110 receives the control request on the control application installed on the second electronic device 108 and accepts the control request. The buyer agent 104, through the first electronic device 102, is now able to remotely control the second electronic device 108. Once the buyer 110 is within the communication range of the electronic lock 112 securing the property 106 access, the native application installed on the buyer's second electronic device 108 is run. The buyer agent 104 enters the confidential alphanumeric password on the native application remotely. Based on a successful match of password, the electronic lock 112 unlocks thereby allowing access to the property 106. The buyer agent 104 and the buyer 110 now start a software application installed on both first electronic device 102 and the second electronic device 108 wherein the software application allows real time vide communication between the buyer agent 104 and the buyer 110. The buyer agent 104 provides a guided virtual tour of the property 106 to the buyer 110. The video call session is recorded by the software application. Once the tour is over, the buyer 110 locks the property 106 to its original state and leaves. This method thereby saves the buyer agent 104 from being physically present every single time a prospective buyer 110 intends to visit the property 106 and at the same time have a peace of mind by securing the access to the property 106.

Figure 2:
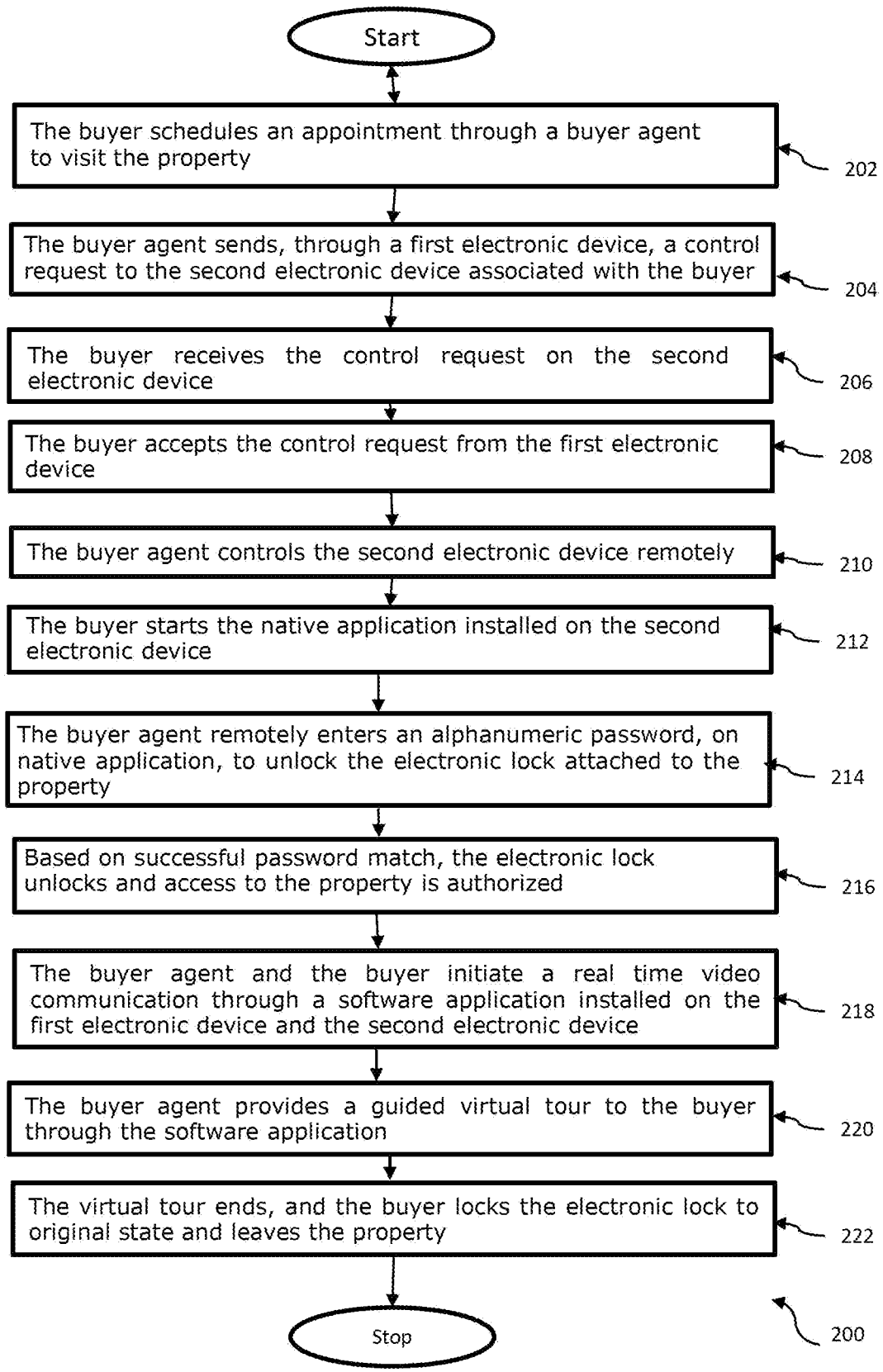
FIG. 2 depicts a flowchart for the method steps as per the present disclosure.

FIG. 2 describes the method 200 in operation through a flowchart. At step 202, the buyer 110 schedules an appointment through a buyer agent 104 to visit the property 106. At step 204, the buyer agent 104 sends, through a first electronic device 102, a control request to the second electronic device 108 associated with the buyer 110. At step 206, the buyer 110 receives the control request on the second electronic device 108. At step 208, the buyer 110 accepts the control request from the first electronic device 102. At step 210, the buyer agent 104 controls the second electronic device 108 remotely. At step 212, the buyer 110 starts the native application installed on the second electronic device 108. At step 214, the buyer agent 104 remotely enters an alphanumeric password, on native application, to unlock the electronic lock 112 attached to the property 106. At step 216, based on successful password match, the electronic lock 112 unlocks and access to the property 106 is authorized. At step 218, the buyer agent 104 and the buyer 110 initiate a real time video communication through a software application installed on the first electronic device 102 and the second electronic device 108. At step 220, the buyer agent 104 provides a guided virtual tour to the buyer 110 through the software application. At step 222, the virtual tour ends, and the buyer 110 locks the electronic lock 112 to original state and leaves the property 106.

It should be understood that any of the embodiments of the present invention can be implemented in the form of control logic using hardware (e.g., an application specific integrated circuit or field programmable gate array) and/or using computer software with a generally programmable processor in a modular or integrated manner. Based on the disclosure and teachings provided herein, a person of ordinary skill in the art will know and appreciate other ways and/or methods to implement embodiments of the present invention using hardware and a combination of hardware and software. Any of the software components or functions described in this application may be implemented as software code using any suitable computer language such as, for example, Java, C, C++, C #, Objective-C, Swift, or scripting language such as Perl or Python using, for example, conventional or object-oriented techniques.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

The specific details of particular embodiments may be combined in any suitable manner without departing from the spirit and scope of embodiments of the invention. However, other embodiments of the invention may involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

I claim:

1. A method for remotely authorizing access to a property, the method comprising:
    receiving a request for access to the property from a buyer;
    sending a control request, by a first electronic device associated with a buyer agent, to a second electronic device associated with the buyer;
    controlling, subsequent to successful acceptance of control request, the operation of the second electronic device by the first electronic device;
    authorizing, by a native application residing on the second electronic device,
    access to the property by unlocking an electronic lock; and,
    initiating a virtual tour of the property by the buyer agent and the buyer;
    wherein the native application is communicably coupled to the electronic lock and is operable to control the electronic lock through one or more security features;
    wherein the buyer agent remotely enters the one or more security features, on the native application, through the first electronic device.

2. The method of claim 1 wherein the control request includes permission to remotely control operation of the second electronic device.

3. The method of claim 1 wherein a control application is installed in both the first electronic device and the second electronic device wherein the control application allows real time device control using the control request.

4. The method of claim 1 wherein the one or more security features comprises an alphanumeric password or NFC based access or QR code-based control.

5. The method of claim 1 wherein the virtual tour of the property is done through a real time video conferencing through a software application installed on the first electronic device and the second electronic device.

6. The method of claim 1 wherein the virtual tour of the property is recorded and saved for later use.

7. The method of claim 1 wherein control of the second electronic device is terminated once the access to the property is authorized.

8. A system for remotely authorizing access to a property, the system comprising:
- a first electronic device associated with a buyer agent wherein the first electronic device receives a request for access to the property from a buyer;
- a second electronic device associated with a buyer of the property wherein the second electronic device receives a control request from the buyer agent;
- a native application residing on the second electronic device wherein the native application is operable to authorize an access to the property by unlocking an electronic lock; and,
- a software application installed on the first electronic device and the second electronic device wherein the software application is operable to initiate, subsequent to unlocking of the electronic lock, a virtual tour of the property by the buyer agent and the buyer;
- wherein the native application is communicably coupled with the electronic lock and is operable to control the electronic lock through one or more security features;
- wherein the buyer agent remotely enters the one or more security features, on the native application, through the first electronic device.

9. The system of claim 8 wherein the control request includes permission to remotely control operation of the second electronic device.

10. The system of claim 8 wherein a control application is installed in both the first electronic device and the second electronic device wherein the control application allows real time device control using the control request.

11. The system of claim 8 wherein the one or more security features comprises an alphanumeric password or NFC based access or QR code-based control.

12. The system of claim 8 wherein the virtual tour of the property is done through a real time video conferencing through the software application.

13. The system of claim 8 wherein the virtual tour of the property is recorded and saved for later use.

14. The system of claim 8 wherein control of the second electronic device is terminated once the access to the property is authorized.

* * * * *